US007126453B2

(12) United States Patent
Sandau et al.

(10) Patent No.: US 7,126,453 B2
(45) Date of Patent: Oct. 24, 2006

(54) KEYLESS SYSTEM FOR ACTUATING A MOTOR-VEHICLE DOOR LATCH

(75) Inventors: Helmut Sandau, Velbert (DE); Bernd Gerdes, Essen (DE)

(73) Assignee: Kiekert AG, Heiligenhaus (DE)

( * ) Notice: Subject to any disclaimer, the term of this patent is extended or adjusted under 35 U.S.C. 154(b) by 221 days.

(21) Appl. No.: 10/079,141

(22) Filed: Feb. 19, 2002

(65) Prior Publication Data

US 2002/0125994 A1 Sep. 12, 2002

(30) Foreign Application Priority Data

Feb. 21, 2001 (DE) ................................ 101 08 354
Jul. 5, 2001 (DE) ................................ 101 32 077

(51) Int. Cl.
*G05B 19/00* (2006.01)

(52) U.S. Cl. ..................... 340/5.61; 340/5.72; 340/5.7; 340/5.1; 340/5.6; 340/5.2; 340/10.1; 340/5.64; 307/10.1; 307/10.2

(58) Field of Classification Search ............... 340/5.61, 340/5.62, 5.72, 5.7, 5.1, 5.6, 5.2, 825.69, 340/825.72, 10.1, 5.64, 5.65, 426.36; 307/10.1, 307/10.2
See application file for complete search history.

(56) References Cited

U.S. PATENT DOCUMENTS

| | | | | |
|---|---|---|---|---|
| 4,871,204 | A | 10/1989 | Cook | |
| 5,730,165 | A | 3/1998 | Philipp | |
| 5,880,538 | A | 3/1999 | Schulz | |
| 6,002,341 | A | 12/1999 | Ohta | |
| 6,075,294 | A | 6/2000 | Van den Boom | |
| 6,661,239 | B1 * | 12/2003 | Ozick | 324/658 |

FOREIGN PATENT DOCUMENTS

| | | |
|---|---|---|
| DE | 44 35 894 | 4/1996 |
| DE | 196 20 059 | 11/1997 |
| EP | 0 954 098 | 11/1999 |

* cited by examiner

*Primary Examiner*—Wendy R. Garber
*Assistant Examiner*—Vernal Brown
(74) *Attorney, Agent, or Firm*—Andrew Wilford

(57) ABSTRACT

A keyless actuating system has a switchable electrical device, a coded transponder adapted to be carried by a user, and a vehicle-mounted interrogating unit adapted when enabled to remotely coact with the transponder for switching the device when the transponder holds a predetermined code. A first capacitor element is carried on the vehicle, and a second capacitor element is carried on the user. A control circuit determines the capacitance between the first and second elements when the user is near the vehicle for enabling the interrogating unit only when the capacitance between the first and second elements passes a predetermined threshold. Normally the second capacitor element is actually the user.

1 Claim, 6 Drawing Sheets

KEYLESS SYSTEM FOR ACTUATING A MOTOR-VEHICLE DOOR LATCH

FIELD OF THE INVENTION

The present invention relates to a keyless actuating system. More particularly this invention concerns such a system for use with a motor-vehicle door latch.

BACKGROUND OF THE INVENTION

A standard motor-vehicle central lock system has a plurality of door latches each provided with an actuator that can move the latch between a locked position in which manual actuation of the latch is ineffective to open the respective door and an unlocked position in which such actuation can open the door. The same or another actuator can also in some systems actually unlatch the door so that, when it operates, the door springs open.

U.S. Pat. No. 6,075,294 of van den Boom describes a motor-vehicle door latch where a capacitor is formed between an element mounted on a door handle and another element carried on the door and juxtaposed across an open gap with the door-handle element. Thus these two capacitor elements form a capacitor of an impedance that is mainly determined by the size of the air gap between the two elements and their areas. When a user also carrying a radio-frequency interrogable transponder or data carrier grabs the handle and thus puts his or her fingers between the two elements, this capacitance changes and a control circuit initiates a query of the transponder. Presuming the transponder holds the appropriate code, the latch is unlocked and the user can open the door.

Such a keyless entry system is extremely convenient in that it allows a user carrying the transponder, typically incorporated in the ignition key or carried on a key chain, to open the vehicle door without having to take any special action. The door is unlocked as the user grasps the handle, but will not unlock for anyone except a person carrying an appropriately encoded transponder.

The above-described system works by forming a fixed-impedance capacitor whose capacitance is changed by interposition of the user's hand between the elements of the capacitor. Such interposition changes the dielectric constant between the two elements and/or effectively decreases the spacing between them by adding the semiconductive hand to one of the elements. It is a simple manner to exploit this change in capacitance to operate the lock system in accordance, for example, with principles described in U.S. Pat. No. 5,730,165 of Philipp.

A problem with this system is that it requires the user to actually grasp the door handle and insert his or her fingers between the two capacitor elements typically mounted on the inside face of the handle and the confronting outside face of the door. If the system does not function very quickly, the user might have to wait briefly while the door is unlocked.

U.S. Pat. No. 6,002,341 of Ohta describes a door-latch actuator that has a contact electrode connected to a latch controller and serving to determine when the door handle is touched by the user. A remote control is provided with an electrode. When the user carrying the remote control touches the door handle a capacitive connection is made between the contact electrode in the door handle of the vehicle and the electrode in the remote control. Thus the body of the user functions as a dielectric between the two electrodes, one on the handle and the other in the remote control. Since the dielectric impedance between the two electrodes changes as the user approaches the door handle, the capacitance changes and this change can be exploited to operate the door latch.

Another system described in U.S. Pat. No. 5,880,538 of Schulz describes a capacitive proximity switch serving to unlock a door latch. This arrangement monitors the capacitance between an electrode and ground and operates the door latch only when the rate of change of this capacitance is greater than a predetermined lower limit. The system works together with a transponder carried by the user, so that the combination of a predetermined change rate of the capacitance and the presence of the transponder makes the door unlatch.

Finally European 0,954,098 of Pavatich relates to a switching arrangement having a conductor that is part of a variable capacitor whose capacitance is related to the proximity of a user. A detector determines changes in this capacitance and produces an output when it indicates that a person is nearby. This detector has an oscillator that is coupled with the conductor and a phase comparator. Changes in capacitance result thus in a variation in the oscillation frequency of the oscillator and can therefore be detected, as in above-cited U.S. Pat. No. 4,871,204.

OBJECTS OF THE INVENTION

It is therefore an object of the present invention to provide an improved system for operating a switchable electrical device in a motor vehicle.

Another object is to provide and improved motor-vehicle keyless entry system.

A further object is the provision of such an improved system for operating a switchable electrical device in a motor vehicle which overcomes the above-given disadvantages, that is which does not require the user to actually touch the vehicle before the latch is unlocked and that is simple and comfortable to operate.

SUMMARY OF THE INVENTION

These objects are obtained in a system having a switchable electrical device, a coded transponder adapted to be carried by a user, and a vehicle-mounted interrogating unit adapted when enabled to remotely coact with the transponder for switching the device when the transponder holds a predetermined code. A first capacitor element is carried on the vehicle, and a second capacitor element is carried on the user. A control circuit determines the capacitance between the first and second elements when the user is near the vehicle for enabling the interrogating unit only when the capacitance between the first and second elements passes a predetermined threshold. Normally according to the invention the second capacitor element is actually the user.

Thus with this system, as the user reaches for the door handle, the capacitance between the user forming one element of capacitor and the other capacitor element carried on the vehicle passes the predetermined threshold and the transponder he or she carries is interrogated, typically through a radio-frequency link. If the transponder is determined to carry the appropriate code, the system then switches the device. The device is typically a motor-vehicle door latch and when it is switched it is unlocked. The interrogating unit is therefore only active when someone's hand is near the door.

The system according to the instant invention uses a simple capacitance threshold to determine when to start the interrogation of the user-carried transponder. This is in stark contrast to the system of, for instance, above-cited U.S. Pat. No. 5,880,538 which senses a rate of change of capacitance, and results in a much simpler more fail-proof system.

This is done according to the invention by in effect establishing a sensor field inside which changes of capacitance are detected. Only capacitance changes inside this field are capable of triggering interrogation of the user-carried transponder. This field thus establishes a minimal distance the user must be from the vehicle-mounted electrode before his or her transponder will be interrogated.

Hence the door will be unlocked normally even before the user touches the handle. If the electronic circuitry takes some time to determine if the code is correct and the mechanical actuator takes some time to actually unlock the latch, the latch will still be unlocked before the user actually grabs the handle and pulls to open the door. Since the user's hand does not have to be interposed between two elements on the door, merely be near the door, there is ample time to unlock the latch.

The invention is based on the fact that a human body normally has, with respect to ground, a capacitance of several hundred picofarads. As a result according to the invention the body forms through ground a closed circuit with the capacitor element on the similarly grounded motor vehicle. This system operates according to Kirchoff's law that states that in a closed circuit the sum of all the voltage drops is equal to zero, going through the circuit in one direction.

As a result as the user's hand approaches the capacitor element on the vehicle, it drains part of the electrical field energy of this element creating, in effect, a tiny current flow. This distance change of the electrodes thus changes the capacitance of the condenser formed by the capacitor element and the user in the picofarad range and is relatively easy to detect and exploit. In this regard reference is again made to above-cited U.S. Pat. No. 5,730,165.

The vehicle according to the invention has a door handle on which the first element is mounted and with respect to which the first element is insulated. It is also possible to provide the first capacitor element on the vehicle adjacent the door handle.

In accordance with another feature of the invention a capacitance shield is provided to one side of the first element. Thus if it is desired to function somewhat like the system of above-cited U.S. Pat. No. 6,075,294, this shield can provided outward of the capacitor element so the system only responds and interrogates the user-carried transponder when the hand is actually starting to be inserted between the handle and the door.

In order to employ this system to also lock the door, a third capacitor element is provided on the vehicle along with circuitry for determining the capacitance between the second and third elements when the user is near the vehicle for locking the vehicle when the capacitance between the second and third elements passes a predetermined threshold. This locking system is normally only activatable when the door is not already locked, so the user need merely wave his hand near the door handle or touch the door handle after getting out of the vehicle to lock up the vehicle. To this end the first and third elements are set in the door handle. They are insulated from each other and from the handle. All of the electronics can be carried in a single chip.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
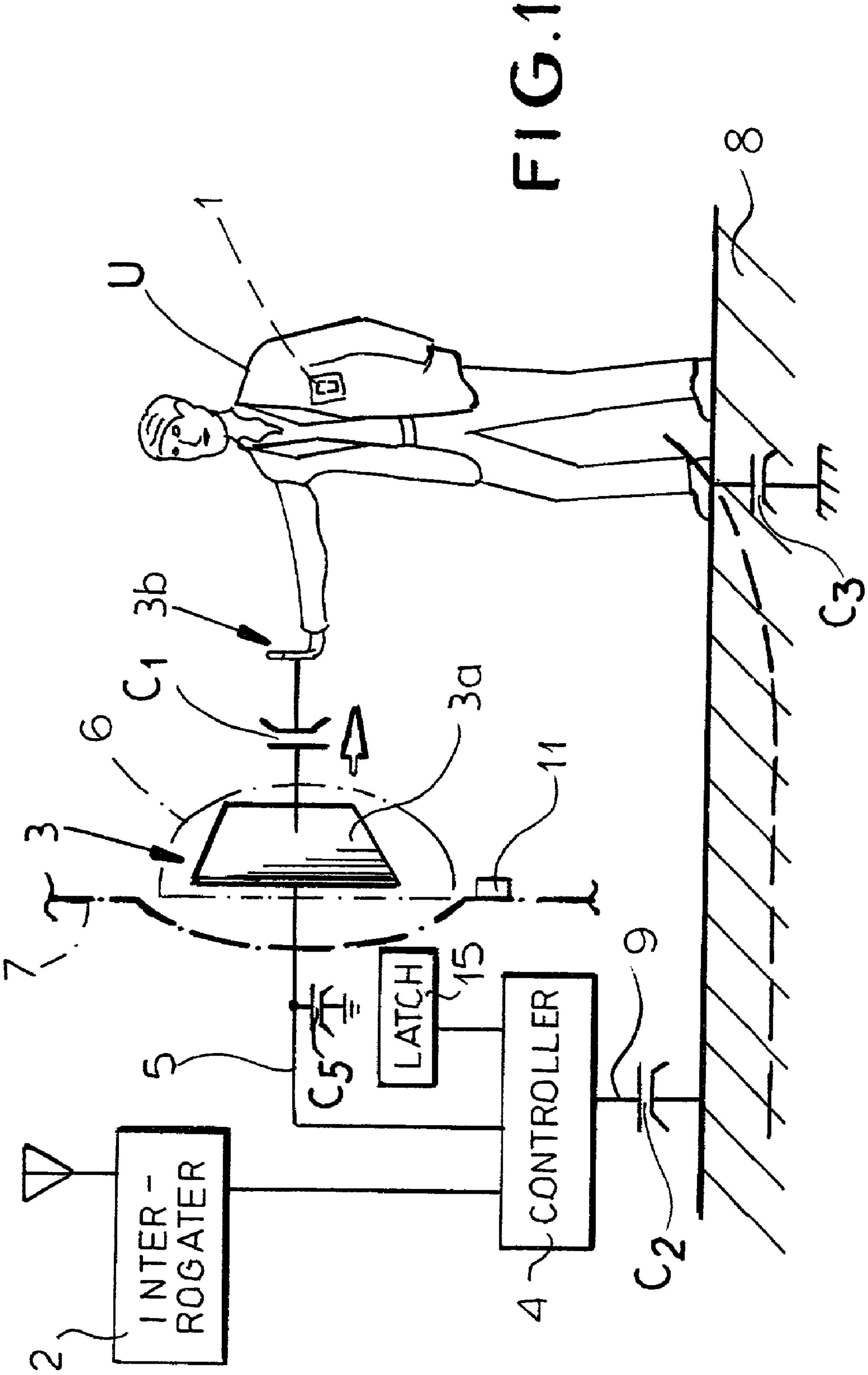
FIG. 1 is a schematic view illustrating the system of this invention.

As seen in FIG. 1 a user 1 carries a bidirectional interactive transponder 1 that holds a user-or vehicle-specific code and that can be interrogated by a unit 2 via a radio-frequency link. A control circuit 4 in the vehicle is connected to this interrogater 2 and via a line 5 with a capacitor element 3*a* carried on a handle 6 of a motor-vehicle door 7. This element 3*a* works together with another capacitor element 3*b* to form a variable capacitor 3.

The transponder 1 can be active or passive. An active transponder is a transmitter/receiver with its own power source that, when it received a predetermined coded signal, transmits out a coded response signal. Low-wattage radio-frequency signals normally are used. A passive transponder is normally a tuned circuit or the like that can be detected remotely by a magnetic field or the like. Either type will work with the system of this invention.

The elements 3*a* and 3*b* have a capacitance indicated at $C_1$ whose value varies as the elements 3*a* and 3*b* are separated from and moved toward each other. Here the hand of the user U constitutes the second element 3*b* of the capacitor 3 and is in effect coupled to ground 8 via a generally fixed capacitance of several hundred picofarads illustrated schematically at $C_3$ and the controller 4 is similarly connected via a line 9 or the motor-vehicle body and a fixed capacitance $C_2$ to ground 8, forming a closed circuit.

Thus under normal circumstances the interrogator 2 is quiescent. When the user U approaches and extends his hand 3*b* toward the handle 6, the capacitance $C_1$ changes and this change is detected by the controller 4. The interrogater 2 is then triggered to see if a transponder 1 in its range of a few meters carries the code specific to the vehicle or user. If so the controller 4 switches a latch 15 from the locked to the unlocked condition, allowing the user U to simply pull on the handle 6 and open the door 7. The control circuit 4 is smart enough to distinguish between the gradual changes in the capacitances $C_2$ and $C_3$, caused for instance by changes in humidity, and the sudden change in the capacitance $C_1$ caused by a user U reaching for the handle 6.

The capacitance $C_1$ is defined as:

$C_1=\epsilon\cdot F/a$, where $\epsilon$=the dielectric constant,

F=the surface area of a plate of the condenser, and a=the spacing between the condenser plates.

Here the spacing a and/or the area F change so that the capacitance $C_1$ lies in the picofarad range with a spacing of 30 mm which is easily detected and dealt with electronically.

The capacitor 3 can also be connected in parallel with a reference capacitor shown schematically at $C_5$ by means of which the electrode 3*a* is periodically charged and discharged. The charging time is determined by the controller 4 and is used as a reference time for evaluating the approach of the user U. It is of course possible to charge and discharge the capacitor 3 without the capacitor $C_5$. In such a system, the approach of the user U changes the amount of time it takes the capacitor 3 to charge or discharge. The threshold value can be related to this charging time which is a direct function of the capacitance of the capacitor 3.

Figure 2:
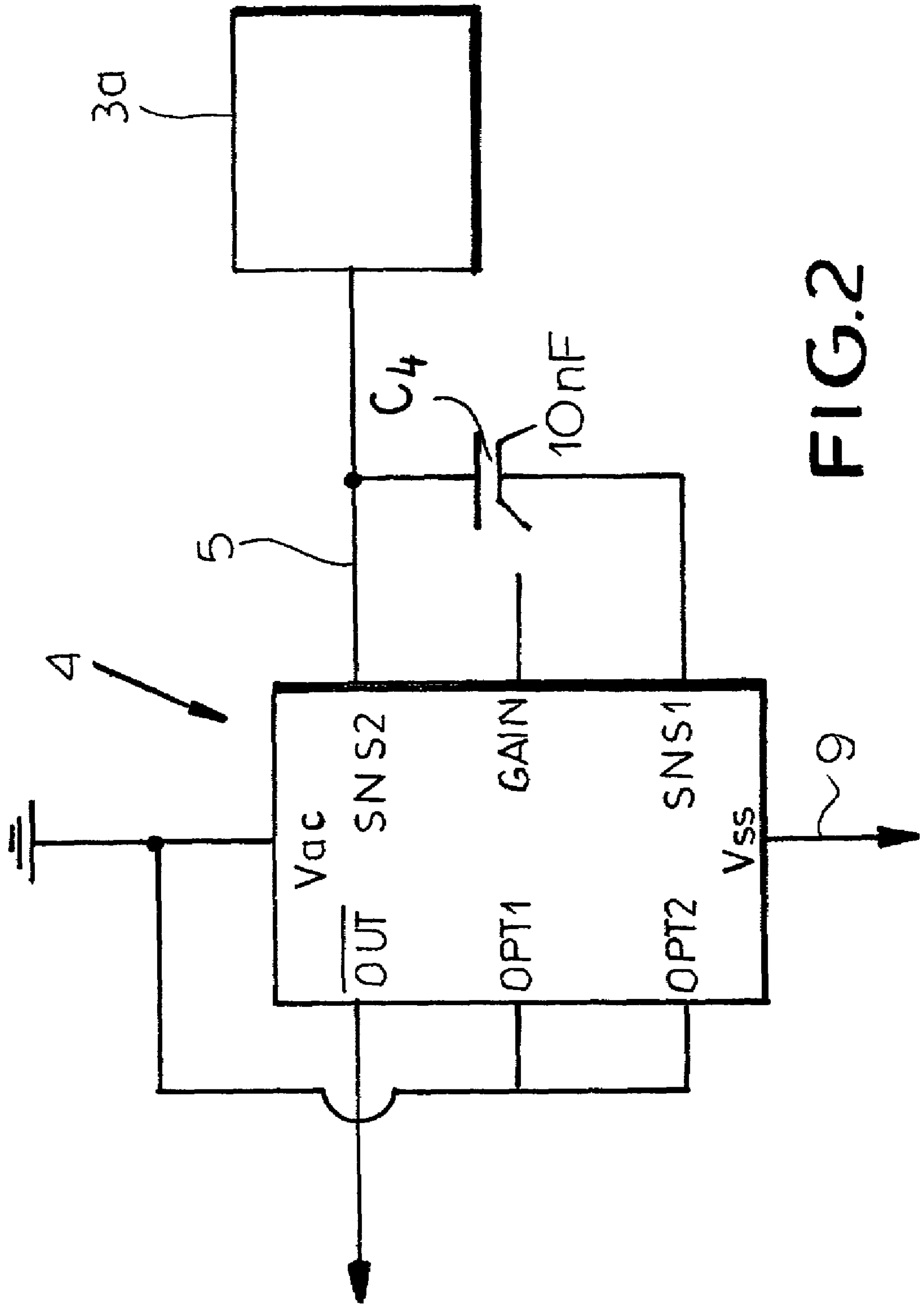
FIG. 2 is a schematic view of a detail of the system.

As shown in FIG. 2 the controller 4 2 can be set up so as to periodically charge and discharge the plate or element 3*a*. A capacitor $c_4$ serves to smooth the input signal.

Figure 3A:
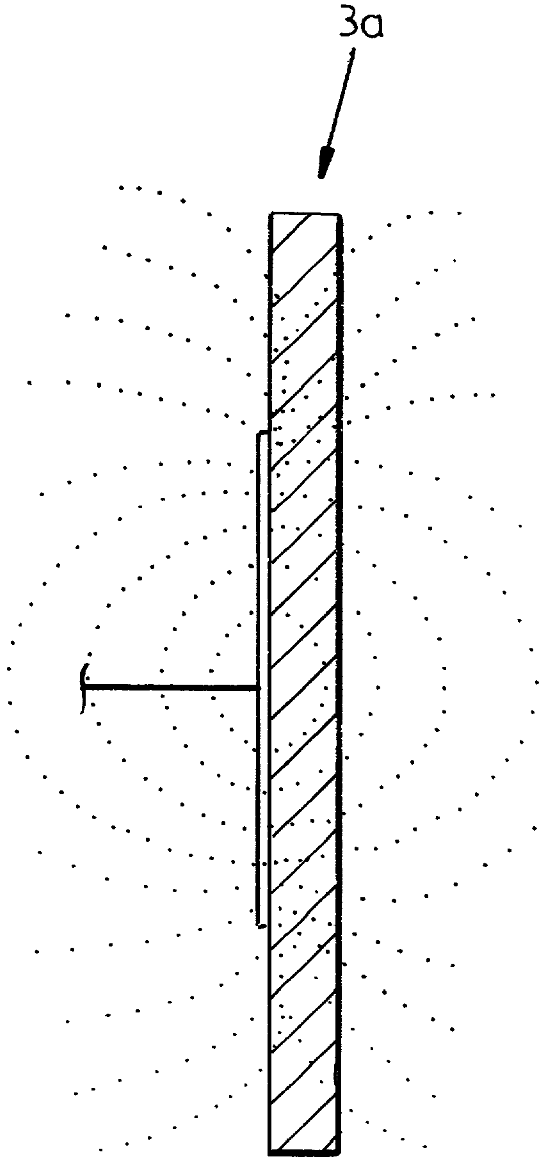
FIGS. 3A and 3B are illustrations of two variants of the system of the present invention.
Figure 3B:
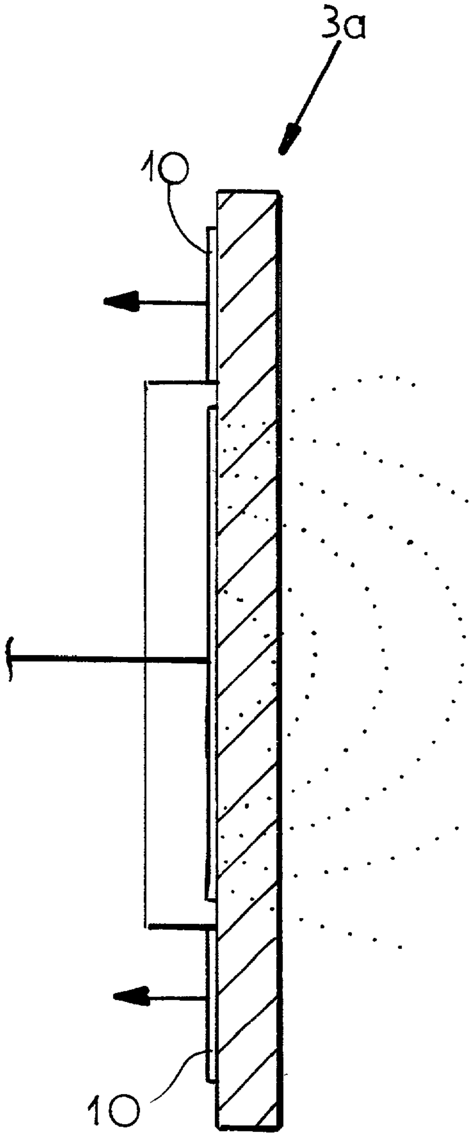

The element 3*a* can be formed as shown in FIG. 3A as a metallic plate set in the plastic handle 6 or forming a part of this handle 6. It can also be a foil imbedded in the dielectric of the handle 6 or a vacuum-deposited conductive metal layer on the handle 6. In order to eliminate the effect of, for instance, the car body, a grounded shield plate 10 (FIG. 3B) can be provided to one side of the plate 3*a* to eliminate the field in that direction.

In addition a second capacitive sensor plate or element 11 can be provided on or adjacent the handle 6 that is connected to the controller 4 to lock the latch 15. This system works identically to that of the element 3*a* except that it serves to lock the vehicle when it is not already locked. Thus as the user U leaves the vehicle he or she need merely wave a hand 3*b* past the element 11, initiating interrogation of the transponder 1 and locking up the vehicle if the proper code is found.

Figure 4:
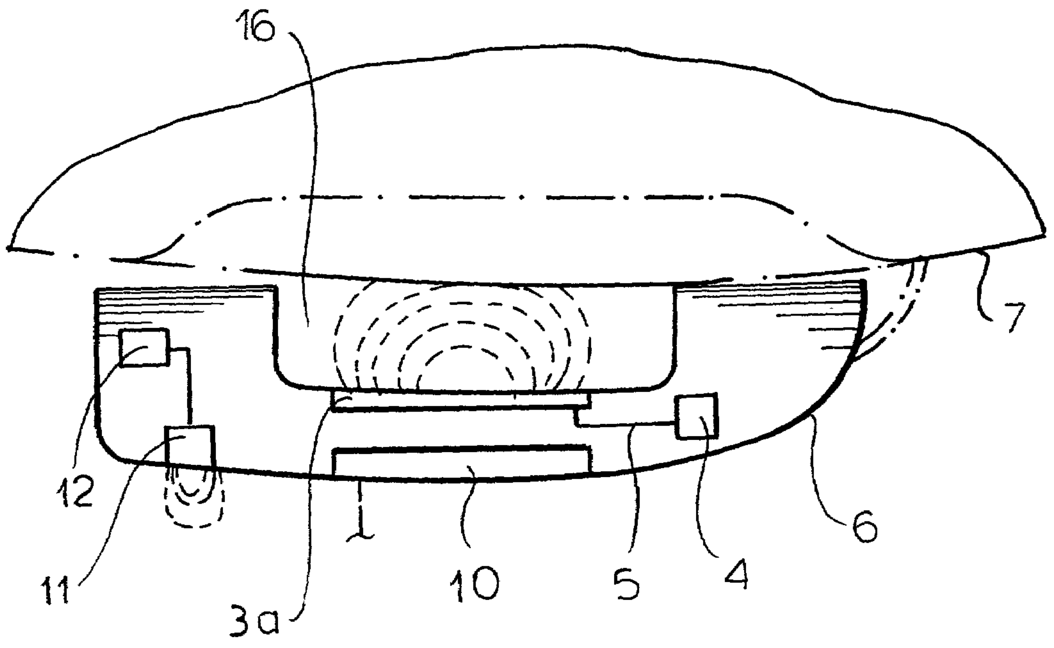
FIG. 4 is a partly schematic and sectional section through the handle of the system according to the invention.

FIG. 4 shows the orientation of the various parts. Here the handle 6 is U-shaped and forms a hole or space 16 with the door 7. The first electrode or capacitor element 3*a* is provided on the inside of the handle 6, facing the door 7, and the shield 10 is provided on the outside of the handle 6. Thus a user's hand constituting the other electrode or capacitor element 3*b* will have to be inserted partially into the space 16 between the handle 6 and the door 7. The door-lock electrode or capacitor element 11 is mounted on the outside of the handle 6 at one end in a location that is convenient to reach when closing the door 7. The control circuitry 4 and control circuitry 12 for the element 11 are inside the handle 6 and may in fact be incorporated in a common chip.

Figure 5:
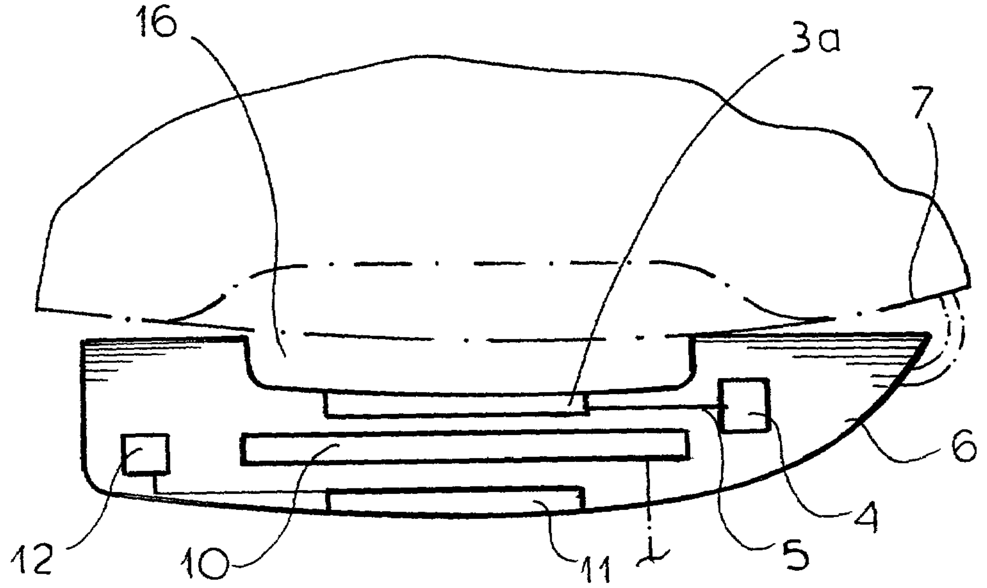
FIG. 5 is a view like FIG. 4 of an alternative system in accordance with the invention.
Figure 6:
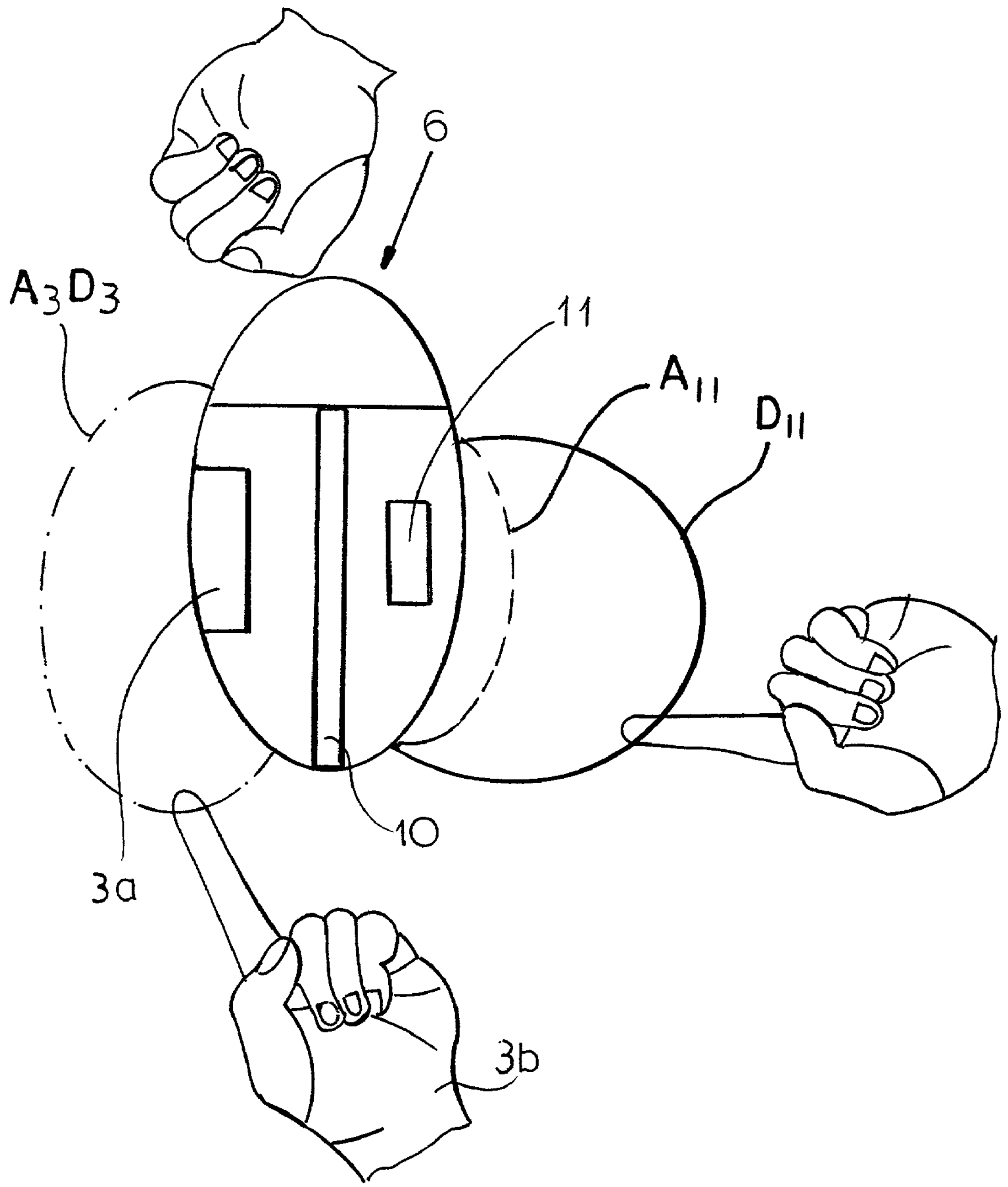
FIG. 6 is a side view of the structure of FIG. 5.

In FIGS. 5 and 6 the capacitor element 11 is mounted on the outside of the handle 5 directly opposite the element 3*a*, shielded therefrom by the grounded shield plate 10. FIG. 6 in particular shows how the electrodes 3*a* and 11 have, in effect, respective fields $D_3$ and $D_{11}$ which extend in opposite directions. The circuitry 4 sets the sensitivity for the door-latching electrode 11 so that it only responds when the users hand 3*b* comes within a much closer range shown at $A_{11}$ equal to one-quarter or one-fifth of the size of the field $D_{11}$. On the other hand the response for the condenser element 3 is set much more sensitive, so that its response field $A_3$ corresponds almost exactly to its capacitance field $D_3$, meaning that the response threshold is set at the limits of sensitivity and any change in capacitance will trigger interrogation of the transponder 1.

It is also important to note that either of the electrodes 3*a* or 11 will react if actually touched and shorted out as this increases the capacitance of the condenser $C_1$ to near infinity.

Figure 7:
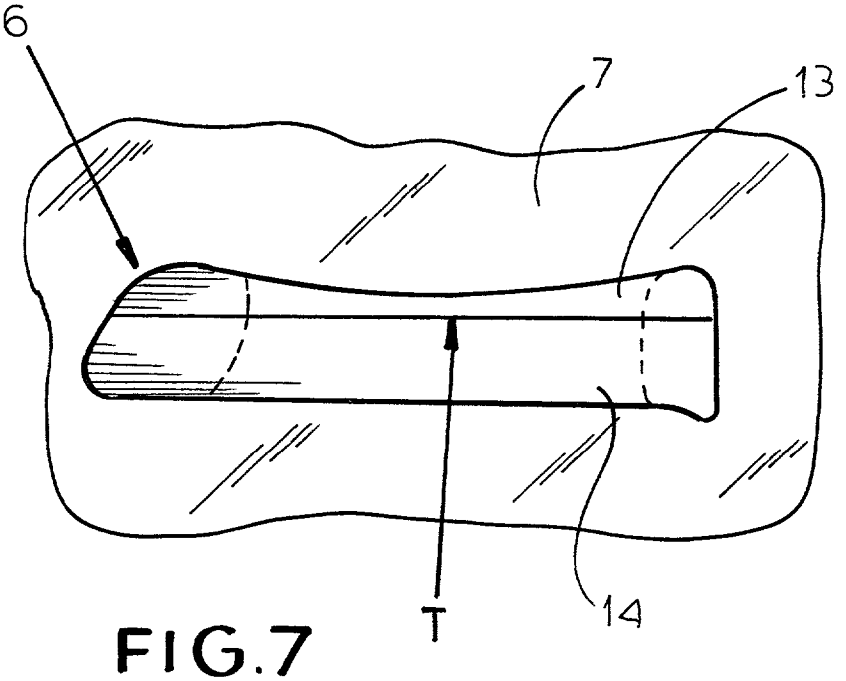
FIG. 7 is a side view of another handle for the system according to the invention.

FIG. 7 shows a variant where the electrode 3*a* is formed in part by or electrically connected with a supplemental shield electrode 13 formed by a conductive shell on the handle 6 that is mounted on a dielectric base part 14. The shell 13 can be made conductive by imbedding copper wires or a conductive mat inside the molded-plastic handle 6. Alternately it can be galvanically plated on the plastic base 14. It is even possible to provide the additional electrode on the door 7. The capacitor plate 3*a* here reacts when the user's hand is within 6 mm. Since it is to one side of the grounded shield 13, it is relatively easy for the user U to select what function is desired, either inserting the hand into the space 16 in back of the handle 6 to open the door 7 or passing it in front of the handle 7 to lock the door 6. Of course if the door is already locked, passing the hand in front of the handle 6 will have no effect; only inserting the hand into the back of the handle 6 will work, in this case to unlock the door 7.

Figure 8:
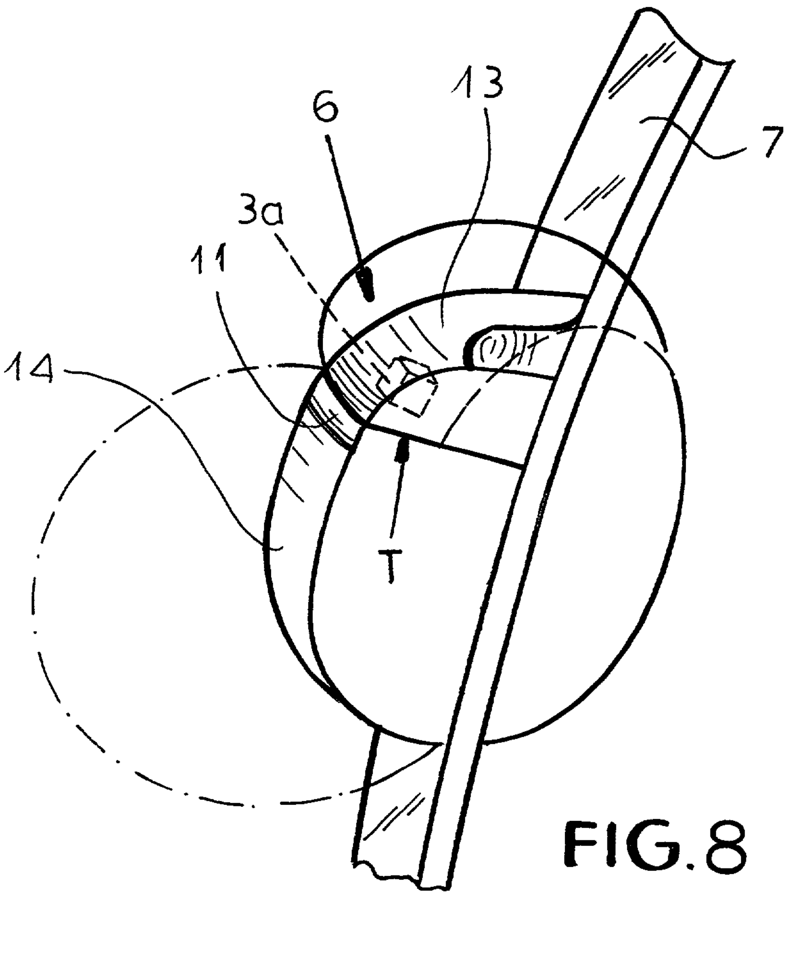
FIG. 8 is an end view of the handle of FIG. 7.

In FIG. 8 the capacitor element 11 is set as a strip at a seam T between the parts 13 and 14 and is set up to be much more sensitive, responding when a hand is within 3 cm of itself. Thus the user need merely wave his hand past the door handle to lock the car after getting out.

We claim:

1. In a motor vehicle, a keyless latch system comprising:

an electrically openable door latch;

a coded transponder adapted to be carried by a user;

vehicle-mounted interrogating means adapted when enabled to remotely coact with the transponder for unlocking the latch when the transponder holds a predetermined code;

a door handle associated with the latch;

a first capacitor element on the handle;

a control for determining the capacitance between the first capacitor element and the user when the user is near the vehicle for enabling the interrogating means only when the capacitance between the element and the user passes a predetermined threshold, said control defining for said first capacitor element a capacitive sensor field within a detection range of said element and a response range within said detection range and bounded by said threshold so that interrogation commences only with a capacitance change in said response range, said control determining said capacitance change by charge/discharge cycling of the condenser formed between the element and the user;

an actuator for locking the latch;

a second capacitor element on the handle separate from the first capacitor element; and control means which is only effective when the latch is not locked connected to the actuator for determining the capacitance between the second element and the user when the user is near the vehicle for locking the latch when the capacitance between the second element and the user passes a predetermined threshold.

* * * * *